United States Patent
Maehana et al.

(10) Patent No.: US 12,011,761 B2
(45) Date of Patent: Jun. 18, 2024

(54) THREE-DIMENSIONAL SHAPING DEVICE AND THREE-DIMENSIONAL SHAPING METHOD

(71) Applicant: KOMATSU NTC LTD., Toyama (JP)

(72) Inventors: Hidekazu Maehana, Toyama (JP); Daisuke Noda, Toyama (JP); Tsunemoto Kuriyagawa, Miyagi (JP); Masayoshi Mizutani, Miyagi (JP)

(73) Assignee: KOMATSU NTC LTD., Toyama (JP)

( * ) Notice: Subject to any disclaimer, the term of this patent is extended or adjusted under 35 U.S.C. 154(b) by 723 days.

(21) Appl. No.: 17/254,699

(22) PCT Filed: Mar. 4, 2019

(86) PCT No.: PCT/JP2019/008404
§ 371 (c)(1),
(2) Date: Dec. 21, 2020

(87) PCT Pub. No.: WO2019/244416
PCT Pub. Date: Dec. 26, 2019

(65) Prior Publication Data
US 2021/0114108 A1      Apr. 22, 2021

(30) Foreign Application Priority Data
Jun. 20, 2018   (JP) ................. 2018-116750

(51) Int. Cl.
*B22F 10/85*   (2021.01)
*B22F 10/25*   (2021.01)
(Continued)

(52) U.S. Cl.
CPC .............. *B22F 10/85* (2021.01); *B22F 10/25* (2021.01); *B22F 10/28* (2021.01); *B22F 12/222* (2021.01);
(Continued)

(58) Field of Classification Search
CPC .... B23K 26/12; B23K 26/082; B23K 26/032; B23K 26/0342; B33Y 50/02; B33Y 10/00;
(Continued)

(56) References Cited

U.S. PATENT DOCUMENTS

2014/0302187 A1   10/2014   Pawlikowski et al.
2017/0209958 A1    7/2017   Soshi
(Continued)

FOREIGN PATENT DOCUMENTS

CN      105828985 A    8/2016
CN      107685149 A    2/2018
(Continued)

OTHER PUBLICATIONS

Machine Translation of Ljungblad (CN 105828985) performed on Sep. 1, 2023 (Year: 2016).*
(Continued)

*Primary Examiner* — Brian W Jennison
(74) *Attorney, Agent, or Firm* — CRGO Global; Steven M. Greenberg

(57) ABSTRACT

The three-dimensional shaping device (100) is provided with a powder supply device (10) to supply powder (90) by dropping the powder toward a surface (81) of a workpiece (80) as a shaping object, the surface, for example, being a curved surface. Further, the three-dimensional shaping device (100) is provided with a laser light irradiation device (20) to irradiate a layer of the powder (90) supplied and deposited by the powder supply device (10) with a laser light (25) as an energy beam. In this way, a three-dimensional shaping device and a three-dimensional shaping method, which are capable of shaping a beam structure on a curved surface of a shaping object, are provided.

6 Claims, 3 Drawing Sheets

(51) Int. Cl.

| | |
|---|---|
| *B22F 10/28* | (2021.01) |
| *B22F 12/00* | (2021.01) |
| *B22F 12/30* | (2021.01) |
| *B22F 12/41* | (2021.01) |
| *B22F 12/50* | (2021.01) |
| *B22F 12/53* | (2021.01) |
| *B22F 12/90* | (2021.01) |
| *B23K 26/03* | (2006.01) |
| *B23K 26/082* | (2014.01) |
| *B23K 26/12* | (2014.01) |
| *B23K 26/342* | (2014.01) |
| *B33Y 10/00* | (2015.01) |
| *B33Y 30/00* | (2015.01) |
| *B33Y 50/02* | (2015.01) |

(52) U.S. Cl.
CPC ............ *B22F 12/224* (2021.01); *B22F 12/30* (2021.01); *B22F 12/38* (2021.01); *B22F 12/41* (2021.01); *B22F 12/50* (2021.01); *B22F 12/53* (2021.01); *B22F 12/90* (2021.01); *B23K 26/032* (2013.01); *B23K 26/342* (2015.10); *B33Y 10/00* (2014.12); *B33Y 30/00* (2014.12); *B33Y 50/02* (2014.12); *B23K 26/082* (2015.10); *B23K 26/12* (2013.01)

(58) Field of Classification Search
CPC .......... B33Y 30/00; B22F 12/38; B22F 10/00; B22F 12/33; B22F 12/28; B22F 12/45; B22F 12/49; B22F 12/44; B22F 12/67; B22F 10/28; B22F 10/85; B22F 12/53; B22F 12/222; B22F 12/43; B22F 12/41; B22F 12/90; B29C 64/209; B29C 64/153; B29C 64/268

See application file for complete search history.

(56) References Cited

U.S. PATENT DOCUMENTS

| | | |
|---|---|---|
| 2017/0348904 A1 | 12/2017 | Chang |
| 2019/0061242 A1* | 2/2019 | Herzog .................. B22F 10/28 |

FOREIGN PATENT DOCUMENTS

| | | |
|---|---|---|
| JP | 2000190086 | 7/2000 |
| JP | 2001047520 | 2/2001 |
| JP | 2004124200 | 4/2004 |
| WO | WO2016075803 | 5/2016 |
| WO | WO-2017157648 A1 | 9/2017 |

OTHER PUBLICATIONS

Machine Translation of Wang (CN 107685149) performed on Sep. 1, 2023 (Year: 2018).*
2nd Office Action—CNIPA, Dec. 8, 2022, Komatsu Corporation.
Chinese Office Action, Apr. 26, 2022, Komatsu NPC Co, Ltd.
International Search Report, PCT/JP2019/008404, May 14, 2019.

* cited by examiner

THREE-DIMENSIONAL SHAPING DEVICE AND THREE-DIMENSIONAL SHAPING METHOD

CROSS-REFERENCE TO RELATED APPLICATIONS

This application is a § 371 national phase entry of International Application No. PCT/JP2019/008404, filed Mar. 4, 2019, which claims priority to Japanese Patent Application No. 2018-116750, filed Jun. 20, 2018.

TECHNICAL FIELD

The present invention relates to a three-dimensional shaping device and a three-dimensional shaping method.

BACKGROUND ART

As a three-dimensional shaping technique, the following two technical skills are often used. That is, one is a powder bed fusion bonding method (hereinafter, a PBF (Powder Bed Fusion) method) (for example, refer to Patent literature 1). The other is a direct energy deposition method (hereinafter, a DED (Direct Energy Deposition) method) (for example, refer to Patent literature 2).

In the PBF method, powder is horizontally spread with use of a roller or a blade, then a programmed laser light is scanned over it, so that the powder is melted and joined. A shaping layer having an aimed shape is formed according to a track of the scanning. After that, such a shaping layer is repeatedly laminated, so that a three-dimensional complex shape is formed. In this method, in a state that masses as parts of a product by melting the powder and unmelted powder filled between the masses are disposed as a lower part of the product, a new powder layer is sequentially laminated thereon. The unmelted powder is not removed until the final three-dimensional product is completed. The filled unmelted powder becomes a base for the powder to become an upper layer structure, so that a structure (hereinafter, "beam structure") having a shape in which beam parts and column parts are formed into a complex structure can be shaped.

In this way, the PBF method is capable of shaping of a hollow complex shape which cannot be not realized by removal processing. In particular, a beam structure such as a lattice structure or porous structure can be produced by the PBF method. By applying this beam structure to a part of the shape of an existing component, for example, a component having a high strength and a light weight can be produced. In this way, various benefits can be obtained. In addition, attention is focused on the development of various products by applying the beam structure.

On the other hand, the DED method is a method where powder injected through a nozzle is supplied in a molten pool formed by laser light irradiation, so that the powder is melted to become a part of the molten pool, and then it solidifies and forms a build-up layer. In the DED method, a robot controls a nozzle torch which emits laser light and powder, hereby, build-up repair for a lost part on a component having an arbitrary shape can be done. In addition, the DED method is also capable of giving or shaping a new shape onto an existing component. Furthermore, the DED method is being investigated for the possibility of new functional products by giving or shaping a structure with a material different from the base member.

In this way, the DED method is capable of adding a new structure onto an existing component and repairing an existing component. In other words, the PBF method is a method where the whole of a shaping body is entirely formed with an expensive powder, whereas the DED method is a method where a structure is added to an existing component. For this reason, in the DED method, a low cost bulk body is used as a base and only a necessary part is shaped, so that the DED method uses less powder.

PRIOR ART LITERATURE

Patent Literature

Patent literature 1: JP 2004-124200 A
Patent literature 2: JP 2016-078205 A

SUMMARY OF THE INVENTION

Problems to be Solved by the Invention

However, in a case of considering of shaping a beam structure by the DED method, even if powder for a base is prepared by some method, a lower unmelted powder to be a base is blown away by jet of powder injection. For this reason, it is difficult to shape a beam structure by the DED method.

On the other hand, in the PBF method, in order to prevent shaping from generating defects, it is necessary that powder is accurately supplied to a desired position before shaping and variation in layer thickness of the powder to be supplied is reduced. That is, in the PBF method, powder is necessary to be accurately supplied and accurately disposed. For this reason, in the PBF method, powder is horizontally spread while being pressed by a roller or a blade. In this way, the PBF method is capable of forming a powder layer having a constant thickness on a plane, but it is difficult to form a powder layer having a constant thickness on a component having a free-form surface.

As stated above, in the DED method, shaping on a curved surface is possible, but shaping of a beam structure is not possible. On the other hand, in the PBF method, shaping of a beam structure is possible, but shaping on a curved surface is not possible. In other words, by conventional three-dimensional shaping techniques, it is not possible to shape a beam structure on a curved surface of an existing component (workpiece) as a shaping object.

An object of the present invention is to provide a three-dimensional shaping device and a three-dimensional shaping method which are capable of shaping a beam structure on a curved surface of a shaping object.

Means for Solving the Problems

In order to solve the problems, a three-dimensional shaping device according to the present invention is provided with a powder supply device to supply powder by dropping the powder toward a surface of a shaping object. Further, the three-dimensional shaping device is provided with an energy beam irradiation device to irradiate a layer of the powder which is supplied and deposited by the powder supply device with an energy beam.

A three-dimensional shaping method according to the present invention includes a powder supply process to supply powder by dropping the powder toward a curved surface of a shaping object. Further, the three-dimensional shaping method includes an energy beam irradiation process to irradiate a layer of the powder which is supplied and deposited in the powder supply process with an energy beam.

Effect of the Invention

According to the present invention, a three-dimensional shaping device and a three-dimensional shaping method, which are capable of shaping a beam structure on a curved surface of a shaping object, can be provided.

MODE FOR CARRYING OUT THE INVENTION

An embodiment of the present invention will be explained in detail appropriately with reference to drawings. The same symbol is designated to common components or similar components in each drawing, and duplicated explanation is omitted.

Figure 1:
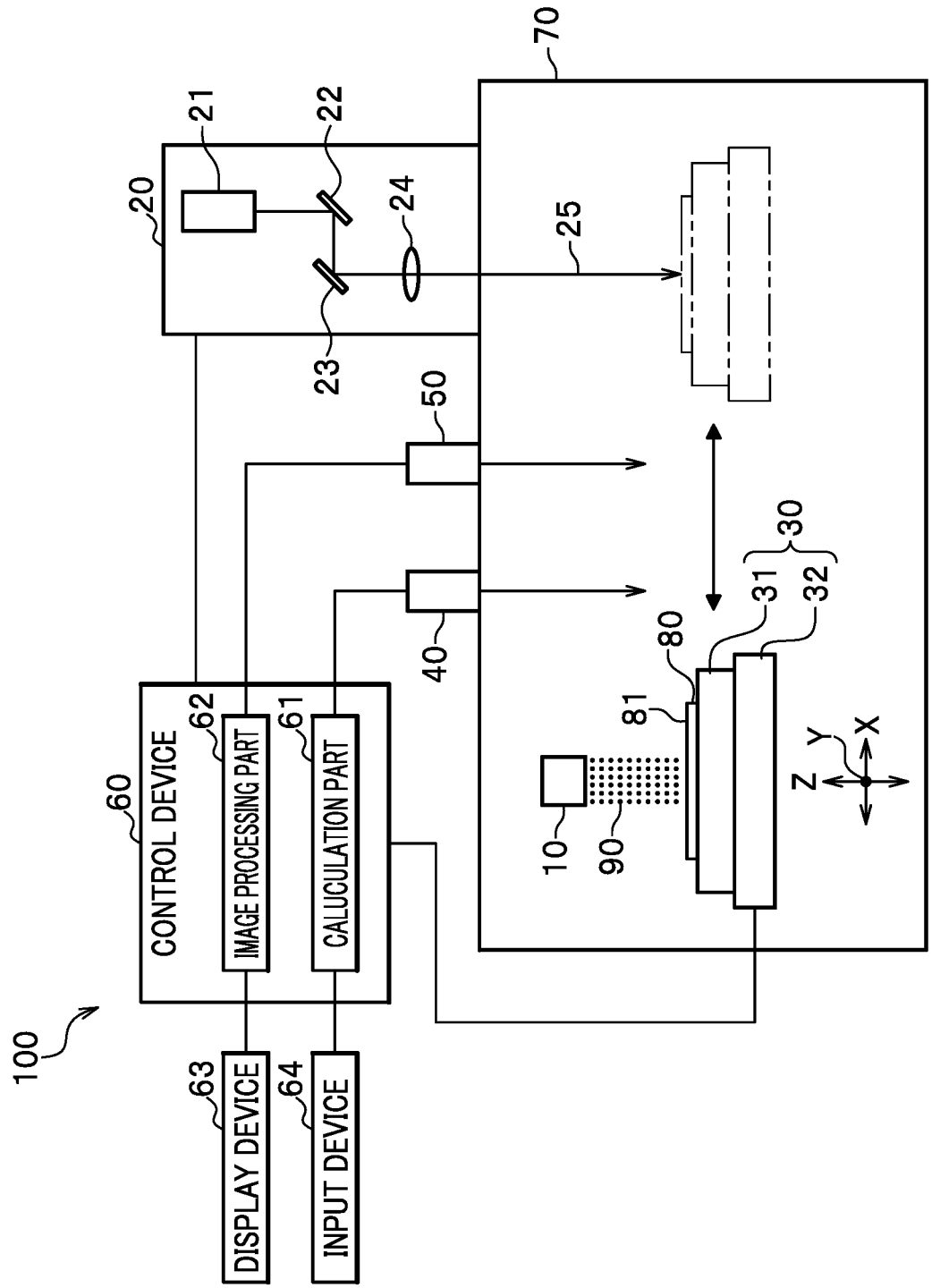
FIG. 1 is a view showing a configuration of a three-dimensional shaping device according to an embodiment of the present invention.

FIG. 1 is a view showing a constitution of a three-dimensional shaping device 100 according to an embodiment of the present invention.

In this embodiment, the three-dimensional shaping device 100 is a three-dimensional shaping device which forms a three-dimensional shaping body by irradiating a layer of metal powder 90 with a laser light 25 as an energy beam.

As shown in FIG. 1, the three-dimensional shaping device 100 includes a powder supply device 10, a laser light irradiation device 20 as an energy beam irradiation device, a moving device 30, a surface shape measuring device 40, a camera device 50, and a control device 60. The powder supply device 10 and the moving device 30 are housed in a chamber 70.

Figure 2:
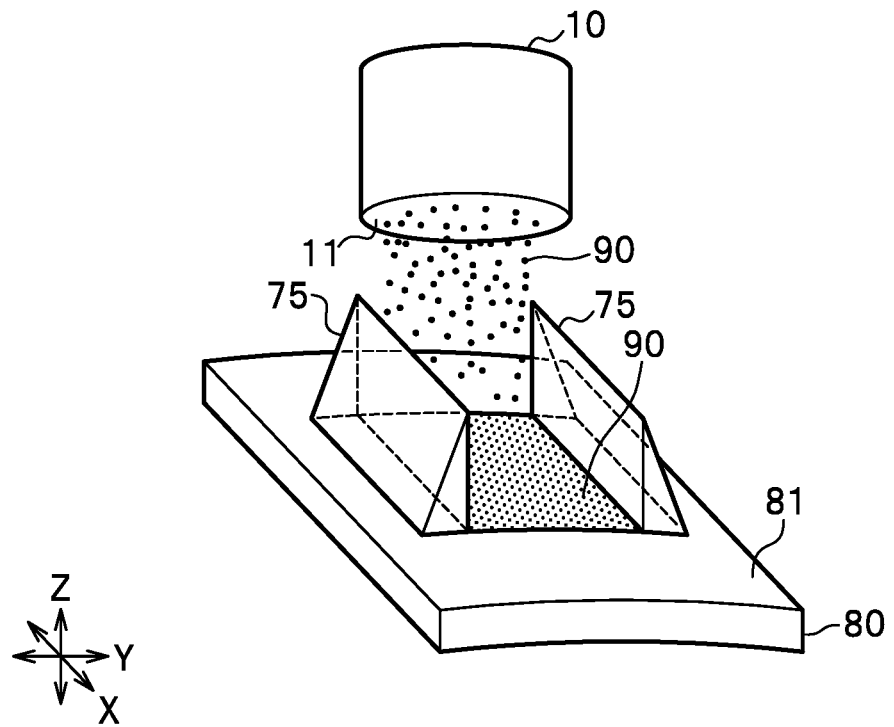
FIG. 2 is a perspective view schematically showing a powder supply device shown in FIG. 1.

FIG. 2 is a perspective view schematically showing the powder supply device 10 shown in FIG. 1. As shown in FIG. 2, the powder supply device 10 supplies the powder 90 by dropping the powder 90 toward a surface 81 of a workpiece 80, the workpiece 80 being an existing component (including a completed product) as a shaping object. Here, the workpiece 80 is a curved plate, and the surface 81 of the workpiece 80 is, for example, a curved surface such as an arc surface. The powder supply device 10 can be constructed by using a high precision powder weighing machine, so that the powder 90 can be stably and continuously supplied with an accurate amount through a supply port 11.

For example, an alloy such as aluminum, iron, stainless, titanium, metal nitride can be used as the metal powder 90. In order to deposit the powder 90 uniformly on the surface 81 of the workpiece 80 without solidifying, it is preferable that the powder 90 has good fluidity to some extent, that is, the angle of repose is relatively small. Here, the angle of repose is an angle between a slope of a mountain and the horizontal plane when the powder 90 having fallen from a predetermined height forms the mountain which is stable and does not collapse. It is preferable that the particle size of the powder 90 is 10 to 45 μm. In a case where the particle size is too small, the fluidity of particles of the powder 90 is impaired, so that it becomes difficult to form a layer of the powder 90, the layer having an uniform thickness. In a case where the particle size is too large, it becomes difficult to obtain an accurate shape of a shaping body.

In this embodiment, the three-dimensional shaping device 100 (refer to FIG. 1) is provided with wall parts 75 which temporarily keep the powder 90 having been supplied by the powder supply device 10 on the surface 81 of the workpiece 80. Each wall part 75 is a plate-like member vertically standing on the surface 81 of the workpiece 80 in order to separate a predetermined region from the other region, the predetermined region including a shaping region on the surface 81 of the workpiece 80. The wall parts 75 of this embodiment are a parallel pair of plate-like members sandwiching the predetermined region mentioned above, but not limited to those, and may be four plate-like members corresponding to respective sides of a rectangle, one frame member, or the like.

The wall parts 75 can be disposed on the surface 81 of the workpiece 80, for example, by moving the wall parts 75 close to and away from the surface 81 of the workpiece 80 by a moving mechanism (not shown) provided at a base 31. However, it is not limited to that. The wall parts 75 may be disposed on the surface 81 of the workpiece 80 by moving the wall part 75 by a robot device.

Note that, the wall parts 75 may not be necessarily provided. For example, in a case where the surface 81 of the workpiece 80 is a plane or a curved surface having a moderate slope or the like, since the powder 90 can be kept on the surface 81 of the workpiece 80 by own holding power, the wall parts 75 can be omitted.

Figure 3:
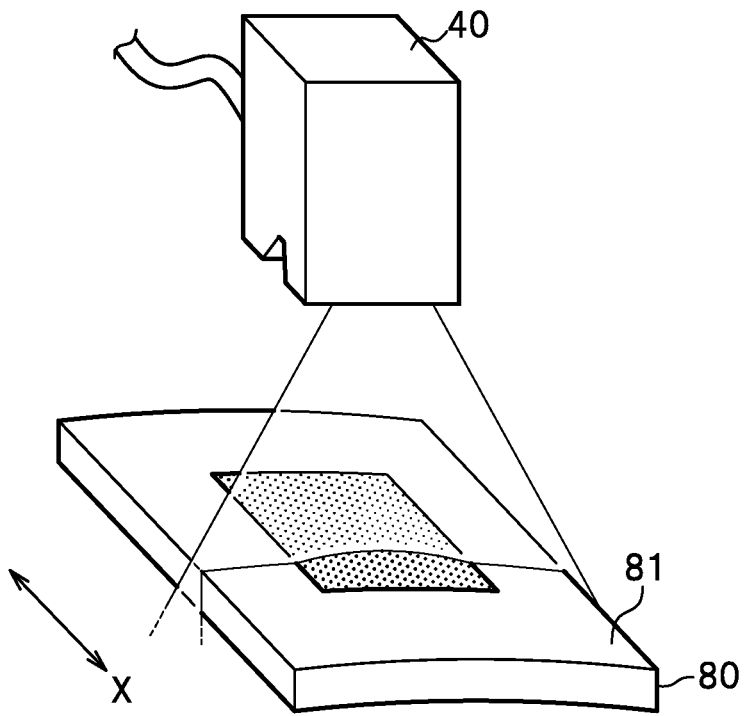
FIG. 3 is a perspective view schematically showing a surface shape measuring device shown in FIG. 1.

FIG. 3 is a perspective view schematically showing a surface shape measuring device 40 shown in FIG. 1.

As shown in FIG. 3, the surface shape measuring device 40 measures a surface shape of the layer of the powder 90, the layer being supplied by the powder supply device 10 and deposited. For example, a laser displacement meter can be used as the surface shape measuring device 40. The laser displacement meter irradiates a measuring object with band-shaped laser light, receives the reflected light by a light receiving element, and generates a shaping profile of the measuring object using the principle of triangulation.

As shown in FIG. 1, the laser light irradiation device 20 irradiates the layer of the powder 90 which is supplied by the powder supply device 10 and deposited with the laser light 25. The laser light irradiation device 20 is provided with a laser light source 21, mirrors (Galvano mirrors) 22, 23, and lens system 24.

The laser light source 21 emits the laser light 25. A fiber laser, $CO_2$ laser or the like can be used as the laser light source 21. Furthermore, it is preferable that the laser light 25 is a pulse oscillation laser. Irradiation with a smaller output is possible by using a pulse oscillation laser. Hence, it is possible to reduce the influence of heat on a shaping object to be a base for shaping. Therefore, deformation of the shaping body can be further suppressed. However, the laser light 25 is not limited to a pulse oscillation laser and may be a CW (continuous wave) laser.

The lens system 24 focuses the laser light 25. Further, by changing angles of the mirrors 22, 23 by a driving device (not shown), an irradiation direction of the laser light 25 is changed. That is, a position at which irradiation of the laser light 25 is performed is adjusted by rotations of the mirrors 22, 23.

The camera device 50 photographs a surface of the layer of the powder 90 after the irradiation of the laser light 25 has been performed. In other words, the camera device 50 photographs a surface of the layer of the powder 90, the layer including the shaping region where the powder 90 has been melted, bonded and solidified by irradiation of the laser light 25 and a region where the powder 90 has not been irradiated with the laser light 25 and thus has not melted.

The moving device 30 is a device to move the workpiece 80. In this embodiment, the moving device 30 is provided with a base 31 on which the workpiece 80 is set and a driving mechanism 32 to move the base 31. The driving mechanism 32 includes a guide device to guide the moving of the base 31 and a driving device to generate the driving force to move the base 31. The driving mechanism 32 can move the base 31 in a X direction, a Y direction and a Z direction, the X direction being a left-right direction in FIG. 1, the Y direction being a direction orthogonal to the sheet of FIG. 1, the Z direction being an upper-lower direction. However, the moving device 30 is not limited to the configuration described above and may be, for example, a robot device to change the posture and position of the workpiece 80 while holding the workpiece 80.

The chamber 70 is a vessel made of metal such as stainless steel. The chamber 70 is configured so that it can be sealed and the chamber 70 is depressurizable by evacuating the inside of the chamber 70 with use of an exhaust mechanism (not shown). Furthermore, the exhaust mechanism also serves as an exhaust port for exhausting metal fumes (metal vapor) generated from the powder melted by the laser during processing. An inert gas such as argon or nitrogen is supplied into the inside of the chamber 70 from which oxygen has been removed by vacuum suction. In addition, the chamber 70 is provided with a window (not shown) for the laser light 25 to pass through, another window for measuring a surface shape, and another window for photographing by the camera device.

The control device 60 is provided with a CPU (central processing unit) and a memory part such as a memory, a hard disk not shown. In the memory part, three-dimensional shape data of a structure to be three-dimensionally shaped and processing condition data are reserved. The three-dimensional shape data and the processing condition data may be created by the control device 60, or by an external device to input them into the control device 60. The control device 60 controls the laser light source 21, the mirrors 22, 23, and the lens system 24 according to the processing condition data to adjust the output characteristics of the laser light 25, a scan speed, a scan interval, and an irradiation position.

The control device 60 controls the moving device 30 to move the workpiece 80. Furthermore, the control device 60 controls the surface shape measuring device 40 to measure a surface shape of the layer of the powder 90, and controls the camera device 50 to photograph a surface of the layer of the powder 90.

The control device 60 includes a calculation part 61 and an image processing part 62. The calculation part 61 and the image processing part 62 are realized by executing a program stored in the memory part of the control device 60 on the memory. The calculation part 61 calculates a thickness of the layer of the powder 90 based on a change in the surface shape of the layer the powder 90 measured by the surface shape measuring device 40 before and after the powder 90 is supplied. Specifically, a thickness of the layer of the powder 90 is calculated from a shift of a surface of the layer of the powder 90 in the Z direction (upper-lower direction).

Furthermore, the image processing part 62 distinguishes the shaping region based on an image of the surface of the layer of the powder 90 where irradiation of the laser light 25 is performed, the image being photographed by the camera device 50. Specifically, on the surface of the layer of the powder 90, for example, a region having a color different from that of a peripheral region having unmelted powder 90, can be determined as the shaping region where the powder 90 has been irradiated with the laser light 25 and has melted, bonded and solidified.

A display device 63 and an input device 64 are connected to the control device 60. The display device 63 is, for example, a liquid crystal display (LCD). The display device 63 displays various information such as a surface shape of the layer of the powder 90 measured by the surface shape measuring device 40, an image of a surface shape of the layer of the powder 90 photographed by the camera device 50, an operation screen, and a warning message. The input device 64 is, for example, a keyboard or a mouse, and receives user's operations for creating or inputting the three-dimensional shape data and/or the processing condition data and inputs various information such as a start instruction for three-dimensional shaping work.

Figure 4:
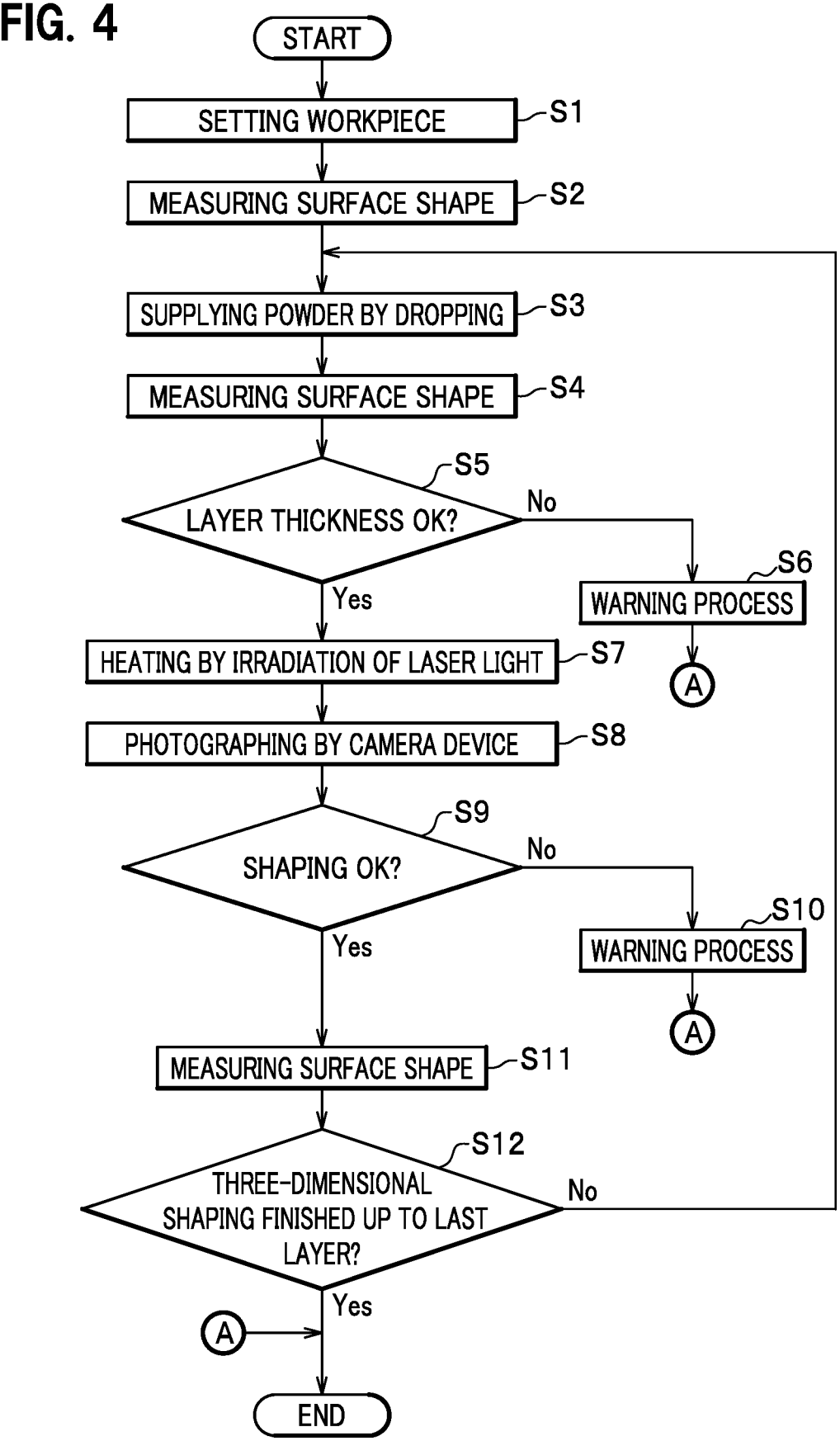
FIG. 4 is a flow chart illustrating contents of a three-dimensional shaping method according to the present embodiment.

FIG. 4 is a flow chart illustrating contents of the three-dimensional shaping method according to the present embodiment.

As shown in FIG. 4, first, the workpiece 80 is set to the base 31 of the moving device 30 to be fixed (S1). Then, after vacuum suction is applied to the inside of the chamber 70, inert gas is supplied to the inside of the chamber 70.

Next, a shape of the surface 81 (surface shape) of the workpiece 80 is measured by the surface shape measuring device 40 (S2). Here, the control device 60 controls the surface shape measuring device 40 to measure the shape of the surface 81 of the workpiece 80 while the control device 60 controls the moving device 30 to move the workpiece 80 in a horizontal direction (for example, in the left direction in FIG. 1, the left direction being a direction from a position under the surface shape measuring device 40 toward a position under the powder supply device 10) at a constant speed.

And next, an appropriate amount of the powder 90 is supplied (S3) by being dropped toward the surface 81 of the workpiece 80 by the powder supply device 10, the surface 81, for example, being curved. Here, the control device 60 controls the powder supply device 10 to drop a certain amount of the powder 90 toward the surface 81 of the workpiece 80 while the control device 60 controls the moving device 30 to move the workpiece 80 in the horizontal direction (in the right direction in FIG. 1) at a constant speed. This allows forming of a thin layer of the powder 90 deposited on the surface 81 of the workpiece 80.

Next, a surface shape of the layer of the powder 90 deposited on the surface 81 of the workpiece 80 is measured (S4) by the surface shape measuring device 40. Here, the control device 60 controls the surface shape measuring device 40 to measure the surface shape of the layer of the deposited powder 90 while the control device 60 controls the moving device 30 to move the workpiece 80 in the horizontal direction (in the right direction in FIG. 1) at a constant speed.

At step S5, the control device 60 calculates a thickness of the layer of the powder 90 based on a change in the surface shape of the layer of the powder 90 before and after the powder 90 is supplied. Here, in a case where a thickness of the lowest layer firstly formed is calculated, the thickness is calculated based on the change from the surface shape (refer to step S2) of the surface 81 of the workpiece 80 measured beforehand. And the control device 60 judges whether or not the calculated thickness of the layer of the powder 90 is within a preset acceptable range of a thickness of one layer.

In a case where the thickness of the layer of the powder 90 is not within the acceptable range (No at S5), the control device 60 ends the three-dimensional shaping work after doing a predetermined warning process (S6). The predetermined warning process is done, for example, in such a manner that a warning message telling that the thickness of the layer of the powder 90 is outside the acceptable range is displayed on the display device 63.

In a case where the thickness of the layer of the powder 90 is within the acceptable range (Yes at S5), heating by irradiation of the laser light 25 is done (S7). That is, the control device 60 controls the laser light irradiation device 20 to irradiate the layer of the powder 90 with the laser light 25 after the control device 60 controls the moving device 30 to move the workpiece 80 to a position under the laser light irradiation device 20. This allows the shaping region where the powder 90 has been melted, bonded and solidified is formed.

Then, the surface of the layer of the powder 90 is photographed (S8) by the camera device 50 after the laser light 25 is emitted. Here, while the control device 60 controls the moving device 30 to move the workpiece 80 in the horizontal direction (in the left direction in FIG. 1) at a constant speed, the control device 60 controls the camera device 50 to photograph the surface of the layer of the powder 90, the surface having been irradiated with the laser light 25.

At step S9, the control device 60 determines the shaping region based on the image of the surface of the layer of the powder 90, the surface having been irradiated with the laser light 25. Then, the control device 60 judges whether or not the determined shaping region is within a preset acceptable range of the shaping region.

In a case where the shaping region is not within the acceptable range (No at S9), the control device 60 ends the three-dimensional shaping work after doing a predetermined warning process (S10). The predetermined warning process is done, for example, in such a manner that a warning message telling that the shaping region is outside the acceptable range is displayed on the display device 63.

In a case where the shaping region is within the acceptable range (Yes at S9), the surface shape of the layer of the powder 90 is measured (S11) by the surface shape measuring device 40, the layer having been irradiated with the laser light 25. Here, while the control device 60 controls the moving device 30 to move the workpiece 80 in the horizontal direction (in the left direction in FIG. 1) at a constant speed, the control device 60 controls the surface shape measuring device 40 to measure the surface of the layer of the powder 90, the layer having been irradiated with the laser light 25. This surface shape measurement allows confirmation on whether or not the height of the laminated shape reaches an aimed height. This measurement means measurement of the surface shape before the powder 90 is supplied for the second and subsequent layers.

At step S12, it is judged whether or not the three-dimensional shaping has been finished up to the last layer. That is, the control device 60 judges whether or not the three-dimensional shaping, in which layers of the shaping region solidified by irradiating the predetermined region of the layer of the powder 90 with the laser light 25 are laminated one layer by one layer, has been finished up to the last layer (the top layer).

In a case where it is judged the three-dimensional shaping has not been finished up to the last layer (No at S12), the control device 60 controls to return to step S3 and to implement the three-dimensional shaping for the next layer (S3 to S12). Note that, the powder 90 which has not been used for the shaping in the previous layer is not removed, and again an appropriate amount of the powder 90 is supplied (S3) by being dropped onto the previous layer to form the next layer having a constant thickness. On the other hand, in a case where it is judged the three-dimensional shaping has been finished up to the last layer (Yes at S12), the control device 60 ends the three-dimensional shaping work.

As stated above, the three-dimensional shaping device 100 according to this embodiment is provided with the powder supply device 10 which supplies the powder 90 by dropping it toward the surface 81 of the workpiece 80, the surface being, for example, a curved surface.

In such a configuration, there is no such a work that the powder 90 is spread horizontally by a roller or a blade like a case of using the PBF method, hence it is possible that the layer of the powder 90 having a constant thickness is formed on the surface 81 of the workpiece 80, the surface 81 having a curved surface. In addition, there is no such concern that unmelted powder 90 in the lower layer to be a base is blown away by the jet flow of the powder 90 like a case of using the DED method. Therefore, it is possible to make the beam structure.

Hence, according to this embodiment, the beam structure can be made on the curved surface 81 of the workpiece 80.

The three-dimensional shaping device 100 according to this embodiment is provided with the moving device 30 to move the workpiece 80. Such a configuration allows the powder 90 to drop toward the surface 81 of the workpiece 80 while moving the workpiece 80 at a constant speed. In other words, it is not necessary for the powder supply device 10 to be moved for supplying the powder 90, so that it can be fixed. Hence, the fixed powder supply device 10 steadily and continuously supplies an exact amount of the powder 90, so that the layer of the powder 90 having a more uniform thickness can be formed on the surface 81 of the workpiece 80.

Further, the workpiece 80 is moved reciprocally between the powder supply device 10 and the laser light irradiation device 20, so that the layer of the powder 90 and the layer of the shaping region solidified by irradiation of the laser light 25 can be alternately, continually and easily formed.

And further, the top surface of the layer of the powder 90 can be kept at a constant height by moving the workpiece 80 downward as a layer of the shaping region is laminated one after another. This allows the layer of the powder 90 and the layer of the shaping region solidified by irradiation of the laser light 25 to be more accurately formed.

In this embodiment, the thickness of the layer of the powder 90 is calculated based on a change in the surface shape of the layer of the powder 90 measured by the surface shape measuring device 40. Hence, it is possible that shaping defects are prevented in advance from occurring by checking variations of the thickness of the layer of the powder 90.

In this embodiment, the shaping region is determined based on an image photographed by the camera device 50. Therefore, it is possible to prevent shaping defects from occurring by checking whether or not the determined actual shaping region matches the preset shaping region.

In this embodiment, the powder 90 supplied by the powder supply device 10 is kept on the surface 81 of the workpiece 80 by the wall parts 75. Hence, the layer of the powder 90 is steadily formed on the surface 81 of the workpiece 80.

In this embodiment, since the powder 90 is metal powder, it is possible to shape a strong metal product.

In the above, the present invention has been described based on the embodiment, but is not limited to the configuration described in the embodiment. In the present invention, the configuration described in the embodiment is appropriately combined or selected, and further, the configuration may be appropriately changed within the range of the object. Further, a part of the configuration of the embodiment may be deleted, replaced or added.

For example, in the embodiment, the powder 90 is metal powder, but is not limited to that, and may be powder such as that of ceramic material.

In the embodiment, the surface 81 of the workpiece 80 is a curved surface of a curved plate such as an arc surface, but is not limited to that. For example, the surface 81 of the workpiece 80 may be a side surface of a column or a surface of a sphere (spherical surface).

In the embodiment, shaping is done on the workpiece 80 being an existing component (including a completed product) as a shaping object, but is not limited to that, and may be shaped on a base member such as a general base member (base plate). In other words, a shaping object is not limited to the workpiece 80, and may be an arbitrary base member.

In the embodiment, an energy beam to irradiate the layer of the powder 90 is the laser light 25, but is not limited to that, and may be, for example, an electron beam.

DESCRIPTION OF THE SYMBOLS

10 Powder supply device
20 Laser light irradiation device (Energy beam irradiation device)
25 Laser light (Energy beam)
30 Moving device
40 Surface shape measuring device
50 Camera device
60 Control device
61 Calculation part
62 Image processing part
75 Wall parts
80 Workpiece
81 Surface
90 Powder
100 Three-dimensional shaping device

The invention claimed is:

1. A three-dimensional shaping device, comprising:
a powder supply device to supply powder by dropping the powder toward a curved surface of a shaping object;
a surface shape measuring device to measure a surface shape of the layer of the powder which is supplied and deposited by the powder supply device;
a calculation part to calculate a thickness of the layer of the powder based on a change in the surface shape measured by the surface shape measuring device before and after the powder is supplied;
an energy beam irradiation device to irradiate a layer of the powder supplied and deposited by the powder supply device with an energy beam if the calculated thickness of the layer of the powder is within a preset acceptable range of a thickness of one layer; and
a moving device to move the shaping object, wherein,
the powder supply device drops the powder toward the surface of the shaping object, while the moving device moves the shaping object in a horizontal direction at a constant speed.

2. The three-dimensional shaping device according to claim 1, further comprising:
a camera device to photograph a surface of the layer of the powder, the surface having been irradiated with the energy beam; and
an image processing part to distinguish a shaping region based on an image photographed by the camera device.

3. The three-dimensional shaping device according to claim 1, further comprising a wall part to keep the powder supplied by the powder supply device on the surface of the shaping object, wherein the wall part is configured to move in a direction close to and away from the surface of the shaping object so that the wall part can be disposed on the surface of the shaping object.

4. The three-dimensional shaping device according to claim 1, wherein the powder is a metal powder.

5. A three-dimensional shaping method, comprising:
a powder supply process to supply powder by dropping the powder toward a curved surface of a shaping object;
a surface shape measurement process to measure a surface shape of the layer of the powder which is supplied and deposited in the powder supply process;
a calculation process to calculate a thickness of the layer of the powder based on a change in the surface shape measured in the surface shape measuring process before and after the powder is supplied;
an energy beam irradiation process to irradiate a layer of the powder supplied and deposited in the powder supply process with an energy beam if the calculated thickness of the layer of the powder is within a preset acceptable range of a thickness of one layer; wherein
the powder supply process comprises dropping the powder toward the surface of the shaping object while moving the shaping object in a horizontal direction at a constant speed.

6. The three-dimensional shaping device according to claim 2, further comprising a wall part to keep the powder supplied by the powder supply device on the surface of the shaping object, wherein the wall part is configured to move in a direction close to and away from the surface of the shaping object so that the wall part can be disposed on the surface of the shaping object.

\* \* \* \* \*